United States Patent [19]
Bate et al.

[11] Patent Number: 5,517,944
[45] Date of Patent: May 21, 1996

[54] POULTRY FEEDER

[75] Inventors: Luis Bate, Bonshaw; Wendell E. Dawson, Charlottetown, both of Canada

[73] Assignee: University of Prince Edward Island, Charlottetown, Canada

[21] Appl. No.: 319,557

[22] Filed: Oct. 7, 1994

[51] Int. Cl.$^6$ .................................................. A01K 39/00
[52] U.S. Cl. .................................................. 119/53
[58] Field of Search ........................... 119/53, 54, 52.1, 119/52.4

[56] References Cited

U.S. PATENT DOCUMENTS

| | | | |
|---|---|---|---|
| 2,667,858 | 2/1954 | Cussotti | 119/52.1 |
| 4,733,634 | 3/1988 | Hooser | 119/51.13 |
| 4,913,092 | 4/1990 | Guaryahu et al. | 119/174 |
| 4,995,343 | 2/1991 | Cole et al. | 119/52.1 X |
| 5,010,851 | 4/1991 | Guaryahu et al. | 119/174 |
| 5,067,443 | 11/1991 | Hurnik et al. | 119/71 |
| 5,168,830 | 12/1992 | Deglis | 119/23 |
| 5,239,943 | 8/1993 | Kim | 119/51.12 |
| 5,251,574 | 10/1993 | Foster et al. | 119/174 |

FOREIGN PATENT DOCUMENTS

| | | |
|---|---|---|
| 527099 | 7/1948 | Canada . |
| 565568 | 9/1955 | Canada . |
| 554215 | 3/1958 | Canada . |
| 2104173 | 2/1994 | Canada . |

Primary Examiner—Thomas Price
Attorney, Agent, or Firm—R. H. Barrigar; Lynn S. Cassan; P. Scott Maclean

[57] ABSTRACT

A feeder for poultry comprising a feed tray, a feed supply stack secured on the tray and audio conveying means to facilitate dispersion of feeding behavior enhancing sounds from the stack a feeding period.

11 Claims, 2 Drawing Sheets

POULTRY FEEDER

The invention relates to an improved feeder for poultry. The feeder provides feed and sounds, eg. maternal vocalizations, to enhance feeding behaviour.

It has been known that feeding behaviour in chicks can be enhanced by playing certain sounds during feeding periods, for example in experiments which supply maternal sounds via audio speakers to a feeding area. However, there has not to date been a feeder for poultry which directly supplies feed and feeding behaviour enhancing sounds in a convenient manner.

The invention therefore provides a feeder for poultry, preferably newborns, comprising a feed tray, a feed supply stack secured on the tray and audio conveying means to facilitate dispersion of feeding behaviour enhancing sounds, preferably maternal vocalizations, from the stack during a feeding period. Preferably, the audio conveying means includes means for dispersing the sounds from a lower half of the stack during the feeding period, most preferably from at least one location on the stack at about the height of a bird's ears when the animal is feeding at the tray. The at least one location is preferably a plurality of locations around a circumference of the stack.

The audio conveying means may include a sound conduit means inside the stack and a speaker mount which is preferably at an upper area of the sound conduit means and above feed when the stack is in use. In such case the speaker mount is adapted to facilitate delivery of sounds from a speaker into the sound conduit means, and the sound conduit means is adapted to be non-obstructive to feed moving from the stack into the tray when the feeder is in use. The speaker may be removably secured on the speaker mount. Preferably, the sounds emanating from the speaker are from a sound track recording, eg. of brood hens.

The invention in another aspect provides for a pre-assembly of the above described poultry feeder, and in yet another aspect provides a stack for the above described poultry feeder.

DESCRIPTION OF THE DRAWINGS

In drawings of preferred embodiments of the invention.

DESCRIPTION OF PREFERRED EMBODIMENTS

Figure 1:
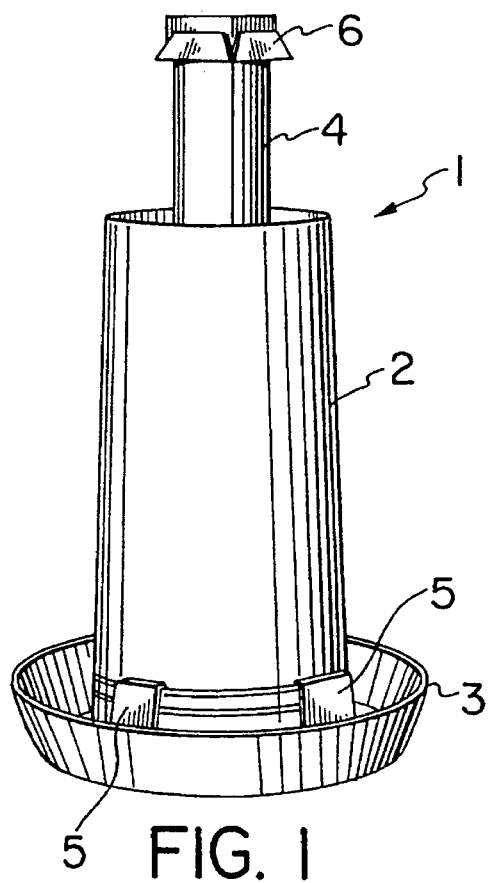
FIG. 1 is a perspective view of a poultry feeder according to the invention.

In FIG. 1 there is shown a preferred poultry, eg. chick, feeder 1 according to the invention which includes a stack 2, tray 3 and sound conduit 4. The stack 2 and tray 3 are somewhat typical of corresponding parts in known commercial poultry feeders, that is apart from the sound conduit 4 and features integrating or related to integrating such conduit into the stack 2. Thus, the stack preferably has a truncated conical shape measuring about 48 cm in height, having a top diameter of about 25 cm and a bottom diameter of about 28 cm. The stack serves as a feed storage area for the feeder. The tray 3 preferably has a saucer shape having a diameter of about 43 cm and a depth of about 6 cm. The stack is attached to the tray for use in the feeder 1 preferably by means of three equidistant hooks 5 (only two visible in FIG. 1), which hooks 5 also serve to regulate the separation between the bottom of the tray 3 and the bottom of the stack; the separation regulates in a known manner the flow of feed from inside the stack to an area of the tray accessible to feeding poultry.

The sound conduit 4 preferably includes a vertical cylinder of about 60 cm in height and about 10 cm in diameter in the centre of the stack. The purpose of this cylinder is to canalize downwards the sound emitted by a speaker 7 placed in or on preferably an upper area of the cylinder, further preferably at a top of the cylinder, eg. at 6 in FIG. 1. When the speaker is so located, it is above the level of feed in the stack and so is less prone to fouling or damage, and is further more easily removed for cleaning or replacement, or for cleaning of the feeder.

The above described dimensions and shapes of the tray and stack are preferable for a preferred embodiment of the present poultry feeder. It will be apparent to the person skilled in the art that these dimensions and/or shapes may be modified to adapt to different production units and species.

Figure 2:
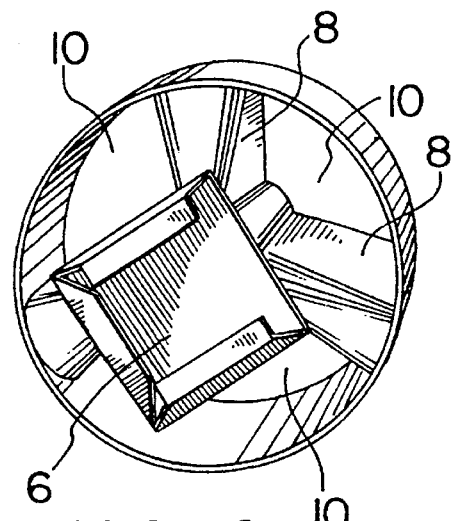
FIG. 2 is a top view of the poultry feeder of FIG. 1.
Figure 3:
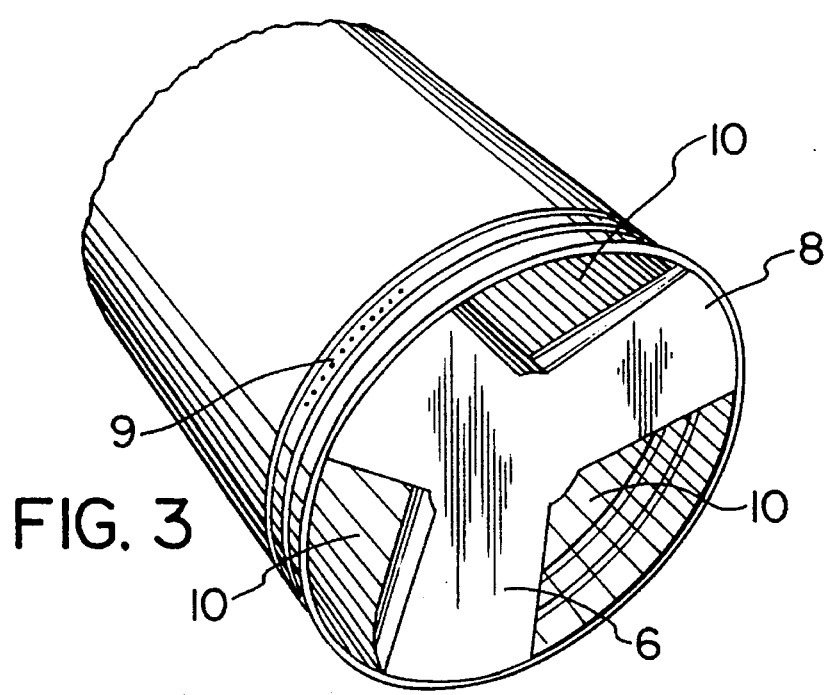
FIG. 3 is a perspective view of the bottom and lower area of the stack of the poultry feeder of FIG. 1; and, FIG. 4 is a perspective view of a sound conduit inside the stack of the poultry feeder of FIG. 1.
Figure 4:
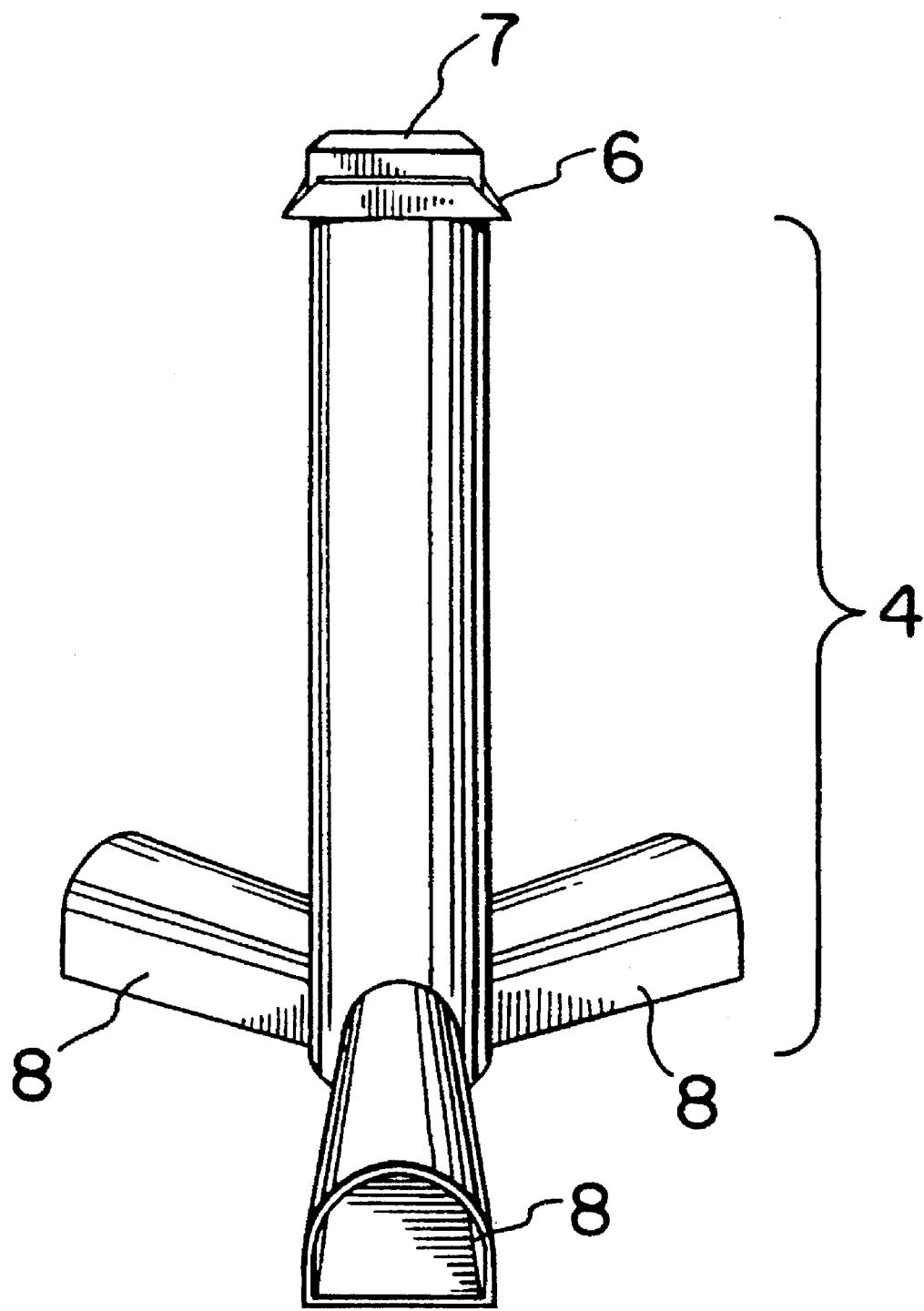

In a bottom half of the cylinder of the preferred embodiment, most preferably in a bottom-most area of the cylinder, the cylinder preferably subdivides into three semi-cylindrical sound conduits 8, best seen in FIGS. 2, 3 and 4, each of which extends radially to a sound dispersal area in the side-wall of the stack, eg. one of such areas is shown at 9 in FIG. 3. Preferably, each sound dispersal area is formed from a plurality of perforations, too small to allow fouling by feed, but sufficient to permit canalized sound to be dispersed to the surrounding area over feed in the tray 3, most preferably at about the surface level of feed in the tray which is about equivalent to the height of newborn birds' ears. Thus, in the preferred embodiment, the attractive impact of the maternal vocalizations on the bird is maximized.

Although the preferred embodiment displays three semi-cylindrical sound conduits 8, it is noted that fewer or greater numbers of such conduits may be provided so long as there are spaces 10 between the conduits (see FIGS. 2 or 3), or a space if there is only one such conduit, sufficient to allow for the passage of feed down the inside of the stack 2 and into the tray 3.

The preferred embodiment also provides for the speaker 7 which can be rapidly removed to allow for cleaning and disinfecting the feeder between batches of birds. The speaker may be wired or use a wireless connection to equipment playing a sound track of maternal vocalizations.

It is further preferred that the sound track used with the feeder be composed of maternal vocalizations recorded from brood females and optionally edited to maximize the feeding behavioral response of the young birds.

It is contemplated that the various components of the above described preferred embodiment may be made or sold in kit or pre-assembly form for subsequent assembly and use. Therefore it will be understood that such kit forms are within the teaching of the present invention.

We claim:

1. A feeder for poultry comprising a feed tray, a feed supply stack secured on the tray, audio conveying means comprising a channel positioned within said stack for passage of sounds from an upper area of said stack to a lower perimeter area of said stack, and a passage within said stack and outside said channel for movement of feed from the stack into the tray, whereby said audio conveying means facilitates dispersion of feeding behaviour enhancing sounds from the stack during a feeding period without obstructing movement of feed from the stack into the tray.

2. The feeder of claim 1 wherein the audio conveying means includes means for dispersing the feeding behavior enhancing sounds from at least one location on a perimeter of the stack at about the height of a bird's ears when the bird is feeding at the tray.

3. The feeder of claim 2 wherein said at least one location is a plurality of locations around a perimeter of the stack.

4. The feeder of claim 1 which further comprises a speaker mount at an upper area of said channel, the speaker mount being positioned to be above an uppermost level of feed in the stack when the feeder is in use and also being positioned for facilitating delivery of sound from a mounted speaker into said upper area of said channel.

5. The feeder of claim 4 wherein the speaker mount is adapted for removably securing a speaker.

6. The feeder of claim 4 wherein said channel comprises at least one lower transverse channel for delivery of sound to at least one location at said lower perimeter area of said stack.

7. The feeder of claim 1 additionally comprising sound-track sound reproduction means connected to a sound receiver end of said channel, and a sound-track recording of brood females provided in said sound-track sound reproduction means.

8. A poultry feeder comprising a feed tray, a feed supply stack secured on the tray, audio conveying means comprising a channel positioned within said stack for passage of maternal vocalizations from an upper area of said stack to a lower perimeter area of said stack at about a level of a bird's ears when the feeder is in use, and a passage within said stack and outside said channel for movement of feed from the stack into the tray, whereby said audio conveying means facilitates dispersion of said maternal vocalizations from the stack during a feeding period without obstructing movement of feed from the stack into the tray, said channel comprising a speaker mount at an upper area of said channel, said speaker mount being positioned to be above an uppermost feed level in the stack when the stack is in use, said speaker mount also being positioned for facilitating delivery of said maternal vocalizations from a mounted speaker into said upper area of said channel.

9. A kit of parts for making a poultry feeder, said kit of parts comprising a feed tray, a feed supply stack for securing on the tray, means for securing the stack on the tray, audio conveying means comprising a channel, said channel being positioned within said stack for passage of sounds from an upper area of said stack to a lower perimeter area of said stack, and a passage within said stack and outside said channel for movement of feed from the stack into the tray, whereby said audio conveying means facilitates dispersion of feeding behaviour enhancing sounds from the stack during a feeding period without obstructing movement of feed from the stack into the tray.

10. The kit of parts of claim 9 wherein said channel comprises a speaker mount secured on an upper sound receiver end of said channel, said sound receiver end being positioned to be at a height above substantially all feed when feed is in said stack during use of the poultry feeder, and the speaker mount being positioned for facilitating delivery of sounds from a mounted speaker into said channel.

11. The kit of parts of claim 10 which further includes sound-track sound reproduction means for connection to said upper sound receiver end of said channel, and a sound-track recording of brood female vocalizations for installation in said sound-track sound reproduction means.

* * * * *